(12) United States Patent
Brütt et al.

(10) Patent No.: US 11,584,345 B2
(45) Date of Patent: Feb. 21, 2023

(54) VALVE ARRANGEMENT FOR A HYDRAULICALLY BRAKED TRACTOR VEHICLE WITH A PNEUMATICALLY BRAKED TRAILER VEHICLE

(71) Applicant: WABCO GmbH, Hannover (DE)

(72) Inventors: Mirko Brütt, Ronnenberg (DE); Michael Haverkamp, Hannover (DE); Jan Spremberg, Wennigsen (DE); Lars Volker, Seelze (DE)

(73) Assignee: ZF CV Systems Hannover GmbH, Hannover (DE)

( * ) Notice: Subject to any disclaimer, the term of this patent is extended or adjusted under 35 U.S.C. 154(b) by 307 days.

(21) Appl. No.: 16/743,223

(22) Filed: Jan. 15, 2020

(65) Prior Publication Data
US 2020/0223414 A1 Jul. 16, 2020

(30) Foreign Application Priority Data
Jan. 15, 2019 (DE) ...................... 10 2019 100 869.7

(51) Int. Cl.
*B60T 13/58* (2006.01)
*B60T 13/68* (2006.01)
(Continued)

(52) U.S. Cl.
CPC .......... *B60T 13/581* (2013.01); *B60T 8/1708* (2013.01); *B60T 13/683* (2013.01); *B60T 13/686* (2013.01);
(Continued)

(58) Field of Classification Search
CPC ...... B60T 8/1708; B60T 8/171; B60T 11/108; B60T 13/581; B60T 13/686; B60T 15/027; B60T 15/028; B60T 2270/402
See application file for complete search history.

(56) References Cited

U.S. PATENT DOCUMENTS 6,206,481 B1 * 3/2001 Kaisers ................. B60T 15/027
303/118.1
9,327,694 B2 * 5/2016 Klostermann .......... B60T 8/171
(Continued)

FOREIGN PATENT DOCUMENTS

DE 102013218079 A1 * 3/2015 ............. B60T 13/57
DE 102014002614 A1 8/2015
(Continued)

*Primary Examiner* — Thomas J Williams
(74) *Attorney, Agent, or Firm* — Dickinson Wright PLLC

(57) ABSTRACT

A valve arrangement (2a, 2b) of a hydraulically braked tractor vehicle for controlling the brake pressure of a pneumatically braked trailer includes an electronically controlled trailer control valve (6) with an inlet valve (14), an outlet valve (16), a pneumatical relay valve (18), a breakaway valve (20) and a brake control pressure sensor (24). The valve arrangement also has a hydraulically controlled backup valve (8) with a hydraulically activated relay valve (46), a redundancy valve (112, 112') and a hydraulic control pressure sensor (50). Output-side brake control lines (40; 62) are connected via a shuttle valve (10) to a brake coupling head (82). The valves (14, 16, 18, 20) and the pressure sensors (24, 50) of the trailer control valve (6), the valves (46, 112, 112') of the backup valve (8) and the shuttle valve (10) may be combined in one trailer control module (98) with a single housing (100).

10 Claims, 5 Drawing Sheets

(51) Int. Cl.
  *B60T 8/17*    (2006.01)
  *B60T 15/02*   (2006.01)
  *G05D 16/20*   (2006.01)
  *F16K 31/06*   (2006.01)

(52) U.S. Cl.
  CPC .......... *B60T 15/027* (2013.01); *B60T 15/028* (2013.01); *G05D 16/2013* (2013.01); *B60T 2270/402* (2013.01); *B60T 2270/413* (2013.01); *F16K 31/06* (2013.01)

(56) References Cited

U.S. PATENT DOCUMENTS

| | | | |
|---|---|---|---|
| 2018/0029569 A1* | 2/2018 | Schick | B60T 8/1708 |
| 2020/0047730 A1* | 2/2020 | Van Thiel | B60T 15/027 |
| 2020/0086843 A1* | 3/2020 | van Thiel | B60T 13/683 |
| 2020/0139952 A1* | 5/2020 | Van Thiel | B60T 13/683 |
| 2020/0223414 A1* | 7/2020 | Brütt | B60T 7/20 |

FOREIGN PATENT DOCUMENTS

| | | |
|---|---|---|
| DE | 102017005979 A1 | 9/2018 |
| EP | 3190014 B1 * | 3/2018 |

* cited by examiner

VALVE ARRANGEMENT FOR A HYDRAULICALLY BRAKED TRACTOR VEHICLE WITH A PNEUMATICALLY BRAKED TRAILER VEHICLE

TECHNICAL FIELD

The subject matter of the present disclosure relates to a valve arrangement of a hydraulically braked tractor vehicle for controlling the brake pressure of a pneumatically braked trailer vehicle, which valve arrangement has an electronically controlled trailer control valve with an inlet valve, with an outlet valve, with a pneumatically activatable relay valve, with a breakaway valve and with a pressure sensor for detecting the applied brake control pressure and furthermore has a hydraulically controlled backup valve with a hydraulically activated relay valve, with a redundancy valve and with a pressure sensor for detecting the hydraulic control pressure, the output-side brake control lines of which are led via a shuttle valve to the coupling head with the designated purpose "brake".

BACKGROUND

Tractor vehicles with an electronically controlled trailer control valve commonly also have, for safety reasons, a redundant control branch for the pneumatic or hydraulic control of the brake control pressure for the trailer vehicle. In the event of a failure of the electronic control or of an electronic brake value signal, a brake control pressure for the trailer vehicle is set and transmitted to the coupling head with the designated purpose "brake" via a switchover of a redundancy valve in a relay valve via a pneumatic or hydraulic brake pressure picked off at a brake line of the tractor vehicle. In this way, the function of the service brakes of the trailer vehicle is ensured even in the event of a failure of the electronic control of the trailer control valve.

DE 10 2017 005 979 A1 describes multiple embodiments of a trailer control valve of the type of a pneumatically braked tractor vehicle for controlling the brake pressure of a pneumatically braked trailer vehicle, in which the redundant control branch is respectively activated via a redundancy valve configured as a solenoid switching valve. In the case of electronic control of the trailer control valve, which is activated during normal operation, a control pressure prevailing at the control pressure input of a pneumatically activated relay valve is set via the electronic activation of two solenoid valves or cycle valves of an inlet valve connected to a reservoir pressure line and of an outlet valve connected to a ventilation line.

In the event of a failure of the electronic control or of an electronic brake value signal, the control pressure input of the relay valve is, via the switchover of the redundancy valve, charged with the brake pressure picked off at a brake line of the tractor vehicle. The application of the brake control pressure transmitted to the coupling head with the designated purpose "brake" is respectively performed by the same pneumatically activated relay valve, and thus in the same way with the exception of the generation or the pick-off of the input-side control pressure.

By contrast, DE 10 2014 002 614 A1 has disclosed multiple embodiments of a valve arrangement of a hydraulically braked tractor vehicle for controlling the brake pressure of a pneumatically braked trailer vehicle which, for the application of the brake control pressure transmitted to the coupling head with the designated purpose "brake", respectively comprise one electronically controlled trailer control valve and one hydraulically controlled backup valve. In the case of electronic control that is activated during normal operation, a control pressure prevailing at the control pressure input of a pneumatically activated relay valve is set within the trailer control valve by the electronic activation of an inlet valve and of an outlet valve.

In the event of a failure of the electronic control or of an electronic brake value signal, the inlet valve is closed and the outlet valve is opened, and thus the trailer control valve is deactivated. At the same time, here, a redundancy valve arranged in the backup valve is opened, and thus the backup valve is activated. In this way, an alternative brake control pressure for the trailer vehicle is applied via a hydraulically activated relay valve which is arranged in the backup valve and at the control pressure input of which a brake pressure picked off at a hydraulic brake line of the tractor vehicle prevails.

The brake control lines that conduct the brake control pressure applied by the trailer control valve and the brake control pressure applied by the backup valve are led via a shuttle valve to the coupling head with the designated purpose "brake". The brake control pressure applied by the trailer control valve can be detected by a pneumatic pressure sensor which is arranged within the trailer control valve. In one embodiment of the known valve arrangement, the hydraulic brake pressure acting as control pressure can be detected by a hydraulic pressure sensor that is arranged within the backup valve. By a comparison of the pressure values detected by sensor means, a functional diagnosis of the trailer control valve and of the pressure sensors is possible.

Until now, the trailer control valve and the backup valve have been configured as separate components with dedicated housings, giving rise, during the installation in the respective tractor vehicle, to a high level of installation effort and, owing to numerous pipe screw connections, the risk of installation errors. Also, with the previous arrangement of the pneumatic pressure sensor, the applied brake control pressure can be monitored only during the normal operation of the valve arrangement, that is to say only in the case of electronic control of the trailer control valve. Since the redundancy valve is arranged in the brake control line at the output side of the hydraulically activated relay valve, the air volume that is enclosed between the relay valve and the redundancy valve during the normal operation of the valve arrangement can lead to pressure oscillations in the respective hydraulic brake line during the actuation of the brake pedal, which pressure oscillations are perceptible as a vibration at the brake pedal.

SUMMARY

The subject matter of the present disclosure was based on the object of further developing the known valve arrangement of a hydraulically braked tractor vehicle for controlling the brake pressure of a pneumatically braked trailer vehicle such that the abovementioned disadvantages are eliminated.

A first aspect of the stated object is achieved by structurally combining the valves and the pressure sensors of the trailer control valve, the valves of the backup valve and the shuttle valve in one trailer control module with a single housing.

The subject matter of the present disclosure is accordingly based on a valve arrangement of a hydraulically braked tractor vehicle for controlling the brake pressure of a pneumatically braked trailer vehicle, which valve arrangement has an electronically controlled trailer control valve and a hydraulically controlled backup valve. The trailer control valve has a pneumatically activated relay valve, a breakaway valve and a pressure sensor for detecting the applied brake control pressure. The backup valve has a hydraulically activated relay valve, a redundancy valve and a pressure sensor for detecting the hydraulic control pressure. The output-side brake control lines of the trailer control valve and of the backup valve are led via a shuttle valve to the coupling head with the designated purpose "brake".

As a result of the combination of the valves and of the pressure sensors of the trailer control valve, of the backup valve and of the shuttle valve in one trailer control module with a single housing, numerous fastening and pipe screw connections are eliminated during the installation on the respective tractor vehicle. In this way, the installation effort is greatly reduced in relation to the previous embodiment of the valve arrangement, and installation errors during the connection of the pipelines are substantially ruled out. Likewise, the electrical control and sensor lines of the solenoid valves and of the pressure sensors can be led to a single plug socket of the trailer control module and, from there, connected via a single cable to the control unit.

In a further integration step, it is also possible for an associated electronic control unit, which is connected via electrical control and sensor lines to solenoid valves and to the pressure sensors of the trailer control module, and/or an immobilizing brake valve, which is connected via a control pressure line to an inverted control pressure input of the trailer control module, to be arranged directly on the housing of the trailer control module, for example fastened by a screw or clip connection to the housing of the trailer control module.

In this way, the control unit and the immobilizing brake valve are firstly assigned to the assembly of the trailer control module, and can be fastened together with the latter to the respective tractor vehicle. Secondly, in this way, the uninstallation and inspection or replacement of the components is easily possible in the event of a fault.

For easy uninstallation, it is also advantageous if the hydraulic pressure sensor and/or the pneumatic pressure sensor, which may be relatively susceptible to faults, are arranged at the outside on the housing of the trailer control module.

To improve the functional diagnosis and the redundancy of the pressure sensors, it is optionally possible for a second hydraulic and/or a second pneumatic pressure sensor to be provided which is connected, in parallel with respect to the first hydraulic pressure sensor and/or pneumatic pressure sensor, to the associated sensor line and which is likewise arranged at the outside on the housing of the trailer control module.

A second aspect of the stated object is achieved by connecting the pneumatic pressure sensor to a valve-side line portion of the brake control line, which valve-side line portion is arranged between the shuttle valve and the brake control output of the trailer control module.

As a result of the connection of the pneumatic pressure sensor downstream of the shuttle valve, the applied brake control pressure, which is conducted via the valve-side portion and an external portion of the brake control line to the coupling head with the designated purpose "brake", can now also be measured during redundancy operation of the trailer control module. By a comparison with the hydraulic brake pressure which is detected by the hydraulic pressure sensor and which is utilized as control pressure of the hydraulically activated relay valve during redundancy operation, it is now also possible for a possible malfunction of the redundant control path to be quickly and reliably identified.

A third aspect of the stated object is achieved by arranging the redundancy valve in an input-side reservoir pressure line of the hydraulically activated relay valve between an output-side reservoir pressure line of the breakaway valve and a reservoir pressure input of the relay valve, wherein the redundancy valve is configured such that the relay-valve-side portion of the reservoir pressure line is ventilated during the normal operation of the trailer control module.

Because the relay-valve-side portion of the reservoir pressure line is now ventilated during the normal operation of the trailer control module, the control piston of the hydraulically activated relay valve is, during an actuation of the brake pedal, pressed against a stop, such that pressure oscillations in the respective hydraulic brake line that would be perceptible as a vibration at the brake pedal can no longer arise.

To achieve a high level of switching dynamics, the redundancy valve may be configured as a pneumatically activated 3/2 directional valve via which the relay-valve-side portion of the reservoir pressure line is aerated when the control pressure input is unpressurized and is ventilated when the control pressure input is conducting pressure. In this case, the pilot valve assigned to the redundancy valve is configured as a 3/2 directional solenoid switching valve, via which the control pressure input of the redundancy valve is ventilated in the electrically deenergized state of the pilot valve and is aerated in the electrically energized state of the pilot valve. During the normal operation of the trailer control module, the pilot valve is electrically energized by the electronic control unit, and thus the control pressure input of the redundancy valve is aerated, whereby the relay-valve-side portion of the reservoir pressure line is ventilated, and thus the reservoir pressure input of the relay valve is placed in an unpressurized state.

As an alternative to the abovementioned embodiment, the redundancy valve may also be configured as a pneumatically activated 3/2 directional valve via which the relay-valve-side portion of the reservoir pressure line is ventilated when the control pressure input is unpressurized and is aerated when the control pressure input is conducting pressure. The pilot valve assigned to this redundancy valve is configured as a 3/2 directional solenoid switching valve, via which the control pressure input of the redundancy valve is aerated in the electrically deenergized state of the pilot valve and is ventilated in the electrically energized state of the pilot valve. During the normal operation of the trailer control module, the pilot valve is electrically energized by the electronic control unit, and thus the control pressure input of the redundancy valve is ventilated, whereby the relay-valve-side portion of the reservoir pressure line is ventilated, and thus the reservoir pressure input of the relay valve is placed in an unpressurized state.

A fourth aspect of the stated object is achieved by configuring the hydraulically activated relay valve to be adjustable or to be equipped with an easily exchangeable valve control set which has at least a valve piston, a valve seat and a valve spring.

Due to the adjustability of the hydraulically activated relay valve or the exchange of the valve control set of the relay valve, the redundant control path of the trailer control module can be adapted relatively easily to the braking characteristics of the respective vehicle combination. By contrast, in the electropneumatic control path of the trailer control module, such an adaptation is realized via a change of control parameters within the control program of the electronic control unit.

The features according to the subject matter of the present disclosure may be implemented separately or in any desired combination in a valve arrangement of a hydraulically braked tractor vehicle for controlling the brake pressure of a pneumatically braked trailer vehicle.

To further illustrate the subject matter of the present disclosure, a drawing with multiple exemplary embodiments is appended to the description.

DETAILED DESCRIPTION OF THE DRAWINGS

Figure 3:
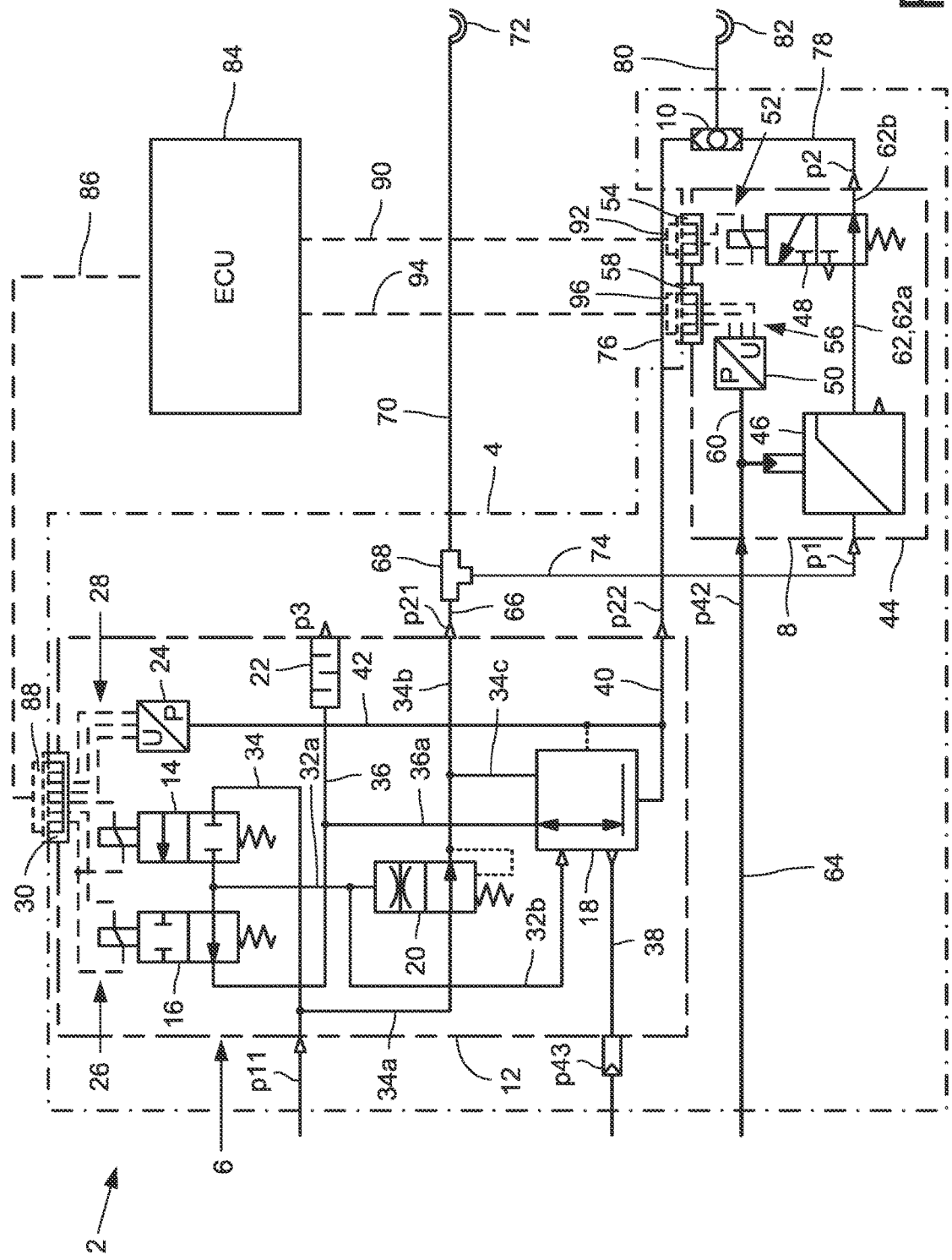
FIG. 3 shows a known valve arrangement of a hydraulically braked tractor vehicle for controlling the brake pressure of a pneumatically braked trailer vehicle in a schematic illustration.

The schematic illustration of FIG. 3 shows a known valve arrangement 2 of a hydraulically braked tractor vehicle for controlling the brake pressure of a pneumatically braked trailer vehicle, which corresponds substantially to the embodiments of such a valve arrangement described in DE 10 2014 002 614 A1. The valve arrangement 2, bordered by a system boundary 4 for illustrative purposes in FIG. 3, comprises an electropneumatically controlled trailer control valve 6, a hydraulically controlled backup valve 8, and a shuttle valve 10.

The trailer control valve 6 has a pneumatically controllable relay valve 18, a pneumatically controllable breakaway valve 20, an inlet valve 14, an outlet valve 16, a silencer 22 and a pneumatic pressure sensor 24, which are arranged within one housing 12. The inlet valve 14 and the outlet valve 16 are each configured as a 2/2 directional solenoid valve, in particular as cycle valves, and serve for the activation of the relay valve 18. The switching solenoids of the inlet valve 14 and of the outlet valve 16 are connected via electrical control lines 26, and the pressure sensor 24 is connected via electrical sensor lines 28, and a plug socket 30 arranged in the outer wall of the housing 12 and a cable 86 equipped with a plug 88, to an electronic control unit (ECU) 84.

The inlet valve 14 is closed in the electrically deenergized state and is open in the electrically energized state. The outlet valve 16 is open in the electrically deenergized state and is closed in the electrically energized state. Branches of a control pressure line 32a, 32b which is connected to the inlet valve 14 and to the outlet valve 16, which branches lead to a first control pressure input of the relay valve 18 and to a control pressure input of the breakaway valve 20, are connectable via the inlet valve 14 to an internal reservoir pressure line 34a and via the outlet valve 16 to a ventilation line 36, 36a. The reservoir pressure line 34a is connected to a reservoir pressure input p11 of the trailer control valve 6.

In the installed state of the valve arrangement 2, the reservoir pressure input p11 is connected to a reservoir pressure line 34 of a pressure supply installation of the tractor vehicle and, when the drive engine of the tractor vehicle is running, conducts a reservoir pressure of a magnitude of approximately 8.5 bar. The ventilation line 36 is led via the silencer 22 to a ventilation output p3 of the trailer control valve 6. The further reservoir pressure line 34a, which branches off from the reservoir pressure line 34, is led via the breakaway valve 20 and an output-side portion 34b of the further reservoir pressure line 34a to a reservoir pressure output p21 of the trailer control valve 6. From the reservoir pressure output p21, an external reservoir pressure line 66, 70 is led via a pipe connector 68, configured as a T piece, to a coupling head with the designated purpose "reservoir" (red) 72.

A further control pressure line 38 is arranged between an inverted control pressure input p43 of the trailer control valve 6 and a second control pressure input of the relay valve 18. In the installed state of the valve arrangement 2, the inverted control pressure input p43 is connected to a control pressure line of an immobilizing brake valve, in which the control pressure is high in the non-actuated state of the immobilizing brake valve and is lowered in the event of actuation of the immobilizing brake valve.

A reservoir pressure input of the relay valve 18 is connected via a reservoir pressure line 34c to the output-side portion 34b of the reservoir pressure line 34a. A ventilation output of the relay valve 18 is connected via a ventilation line 36a to the ventilation line 36.

A brake control output of the relay valve 18 is led via an internal brake control line 40 to a brake control pressure output p22 of the trailer control valve 6. From the brake control pressure output p22, an external brake control line 76 is led via the shuttle valve 10 and an output-side brake control line 80 to a coupling head with the designated purpose with the designated purpose "brake" (yellow) 82. The pressure sensor 24 is connected via a pressure-conducting sensor line 42 to the internal brake control line 40.

The backup valve 8 has a hydraulically activated relay valve 46, a redundancy valve 48 configured as a 3/2 directional solenoid switching valve, and a hydraulic pressure sensor 50, which are arranged within one housing 44. The redundancy valve 48 is connected to the electronic control unit 84 via electrical control lines 52 and a first plug socket 54 arranged in the outer wall of the housing 44 and a cable 90 equipped with a plug 92. Likewise, the pressure sensor 50 is connected to the electronic control unit 84 via electrical sensor lines 56 and a second plug socket 58 arranged in the outer wall of the housing 44 and a cable 94 equipped with a plug 96.

From a hydraulic control pressure input p42 of the backup valve 8, to which a control pressure line 64 which branches off from a hydraulic brake line of the tractor vehicle leads, an internal hydraulic control pressure line 60 is led to a control pressure input of the relay valve 46. The hydraulic pressure sensor 50 is also connected to the control pressure line 60. From the pipe connector 68, a reservoir pressure line 74 is led to a reservoir pressure input p1 of the backup valve 8, which is connected to a reservoir pressure input of the relay valve 46.

The redundancy valve 48 is arranged in an internal brake control line 62 which runs between a brake control pressure output of the relay valve 46 and a brake control pressure output p2 of the backup valve 8. In the electrically deenergized state of the redundancy valve 48, the inner portion 62a and the outer portion 62b of the brake control line 62 are connected to one another. In the electrically energized state of the redundancy valve 48, the inner portion 62a of the brake control line 62 is shut off with respect to the outer portion 62b, and the outer portion 62b of the brake control line 62 is ventilated. From the brake control pressure output p2 of the backup valve 8, an external brake control line 78 is led via the shuttle valve 10 and the output-side brake control line 80 to the coupling head with the designated purpose "brake" (yellow) 82.

During the normal operation of the valve arrangement 2, the trailer control valve 6 is activated, which trailer control valve is activated by the electronic control unit 84 for this purpose. For this purpose, a brake value signal is determined, and transmitted to the control unit 84, by a brake sensor arranged in the footbrake valve of the tractor vehicle. In the event of an actuation of the footbrake valve, a control pressure is set in the control pressure lines 32a, 32b via a corresponding activation of the inlet valve 14 and of the outlet valve 16 of the trailer control valve 6, which control pressure gives rise, in the relay valve 18, to the application of a corresponding brake control pressure in the internal brake control line 40. The set brake control pressure is conducted via the brake control output p22, the external brake control line 76, the shuttle valve 10 and the output-side brake control line 80 to the coupling head with the designated purpose "brake" (yellow) 82.

Since the redundancy valve 48 is electrically energized during the normal operation of the valve arrangement 2, and thus the input-side portion 62a of the internal brake control line 62 of the backup valve 8 is shut off, the backup valve 8 is then deactivated. As a result of the application of a control pressure in the control pressure line 32a of the trailer control valve 6, the breakaway valve 20 is switched into a standby position. In the presence of a higher throughflow rate, which takes effect only in the event of a leak for example in the trailer-side brake control line, the breakaway valve 20 is switched into its throttling position owing to the Venturi effect of a gap flow, in which throttling position the supply of compressed air from the reservoir pressure connection p11 is intensely throttled. The ventilation of the trailer-side reservoir pressure line, via which emergency braking is triggered in the trailer brake valve of the trailer vehicle, then takes place via the external two reservoir pressure lines 66, 70, the internal reservoir pressure lines 34b, 34c, the relay valve 18, the internal brake control line 40, the external brake control lines 76, 80 and the trailer-side brake control line to the leakage point.

In the event of a failure of the electronic control unit 84 or of an electronic brake value signal, the electrical energization of the inlet valve 14 and of the outlet valve 16 of the trailer control valve 6 is shut off, whereby the inlet valve 14 is permanently closed and the outlet valve 16 is permanently opened and thus the trailer control valve 6 is deactivated. Here, at the same time, the redundancy valve 48 of the backup valve 8 is opened as a result of its electrical energization, and the backup valve 8 is thus activated. In this way, a corresponding brake control pressure is now applied in the hydraulically activated relay valve 46 in a manner dependent on the brake pressure acting in the hydraulic control pressure line 64, which brake control pressure is conducted via the internal brake control line 62, 62a, 62b, the brake control output p2, the external brake control line 78, the shuttle valve 10 and the output-side brake control line 80 to the coupling head with the designated purpose "brake" (yellow) 82.

A disadvantage of the known valve arrangement 2 is that the trailer control valve 6 and the backup valve 8 are configured as separate components with dedicated housings 12, 44, giving rise, during the installation in the respective tractor vehicle, to a high level of installation effort and, owing to numerous pipe screw connections, the risk of installation errors. Also, with the previous arrangement of the pneumatic pressure sensor 24, the applied brake control pressure can be monitored only during the normal operation of the valve arrangement 2, that is to say only in the case of electronic control of the trailer control valve 6. Since the redundancy valve 48 is arranged in the brake control line 62 at the output side of the hydraulically activated relay valve 46, the air volume that is enclosed between the relay valve 46 and the redundancy valve 48 during the normal operation of the valve arrangement 2 can lead to pressure oscillations in the respective hydraulic brake line during the actuation of the brake pedal, which pressure oscillations are perceptible as a vibration at the brake pedal.

Figure 4:
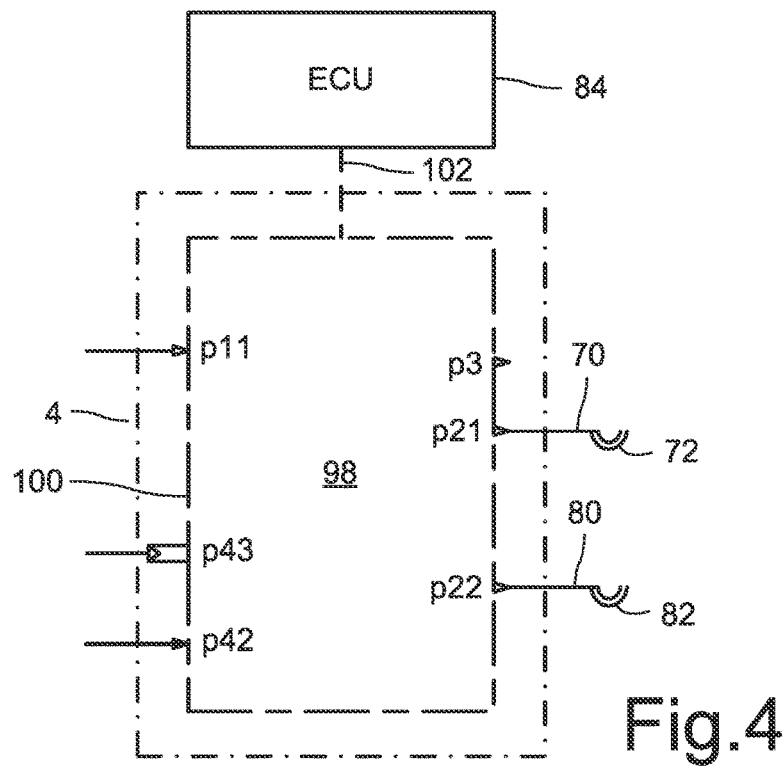
FIG. 4 shows a first general embodiment of a trailer control module according to the subject matter of the present disclosure in a simplified schematic illustration.

The disadvantage of the numerous separate components of the valve arrangement 2 as per FIG. 3 is eliminated in the embodiment according to the subject matter of the present disclosure as per FIG. 4 in that the valves 14, 16, 18, 20, 46, 48 and the pressure sensors 24, 50 of the trailer control valve 6 and of the backup valve 8 and the shuttle valve 10 are combined in a common trailer control module 98 with a single housing 100. The trailer control module 98 can be installed with little installation effort in the respective tractor vehicle, and installation errors during the connection of the pipelines are substantially ruled out. Furthermore, the electrical control lines 26, 52 of the three solenoid valves 14, 16, 48 and the electrical sensor lines 28, 56 of the two pressure sensors 24, 50 can now be advantageously combined in a single cable 102, via which these are connected to the electronic control unit 84 (see FIG. 4).

Figure 5:
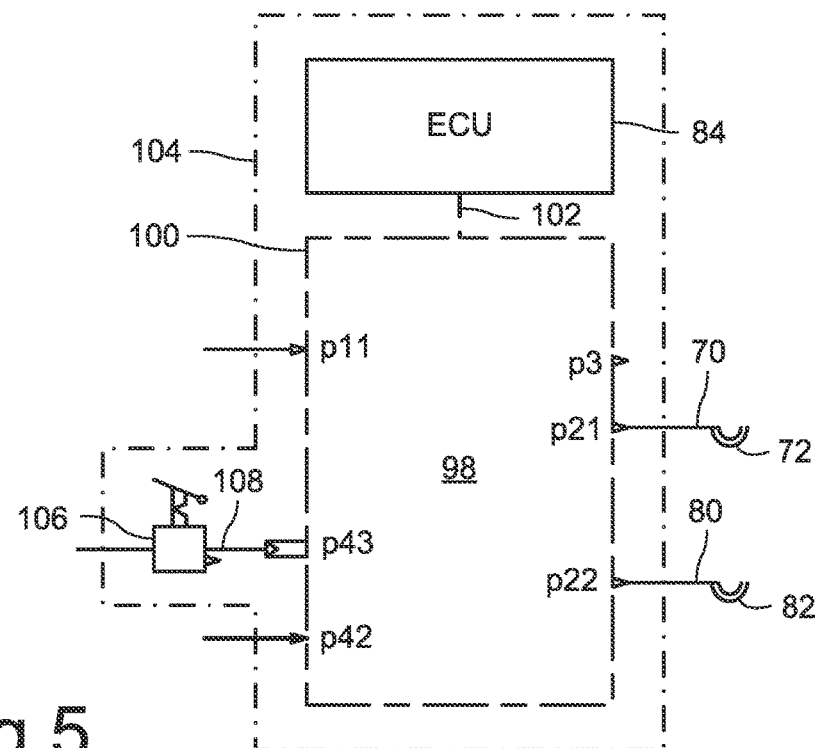
FIG. 5 shows a second general embodiment of a trailer control module according to the subject matter of the present disclosure in a simplified schematic illustration.

In a further integration step as per FIG. 5, the electronic control unit 84 and the immobilizing brake valve 106, which is connected via a control pressure line 108 to the inverted control pressure input p43 of the trailer control module 98, are also assigned to the assembly of the trailer control module 98 as enclosed by the system boundary 104. For this purpose, the control unit 84 and the immobilizing brake valve 106 are fastened by a screw or clip connection to the housing 100 of the trailer control module 98, whereby the components can be easily uninstalled, inspected or replaced in the event of a fault.

Figure 1:
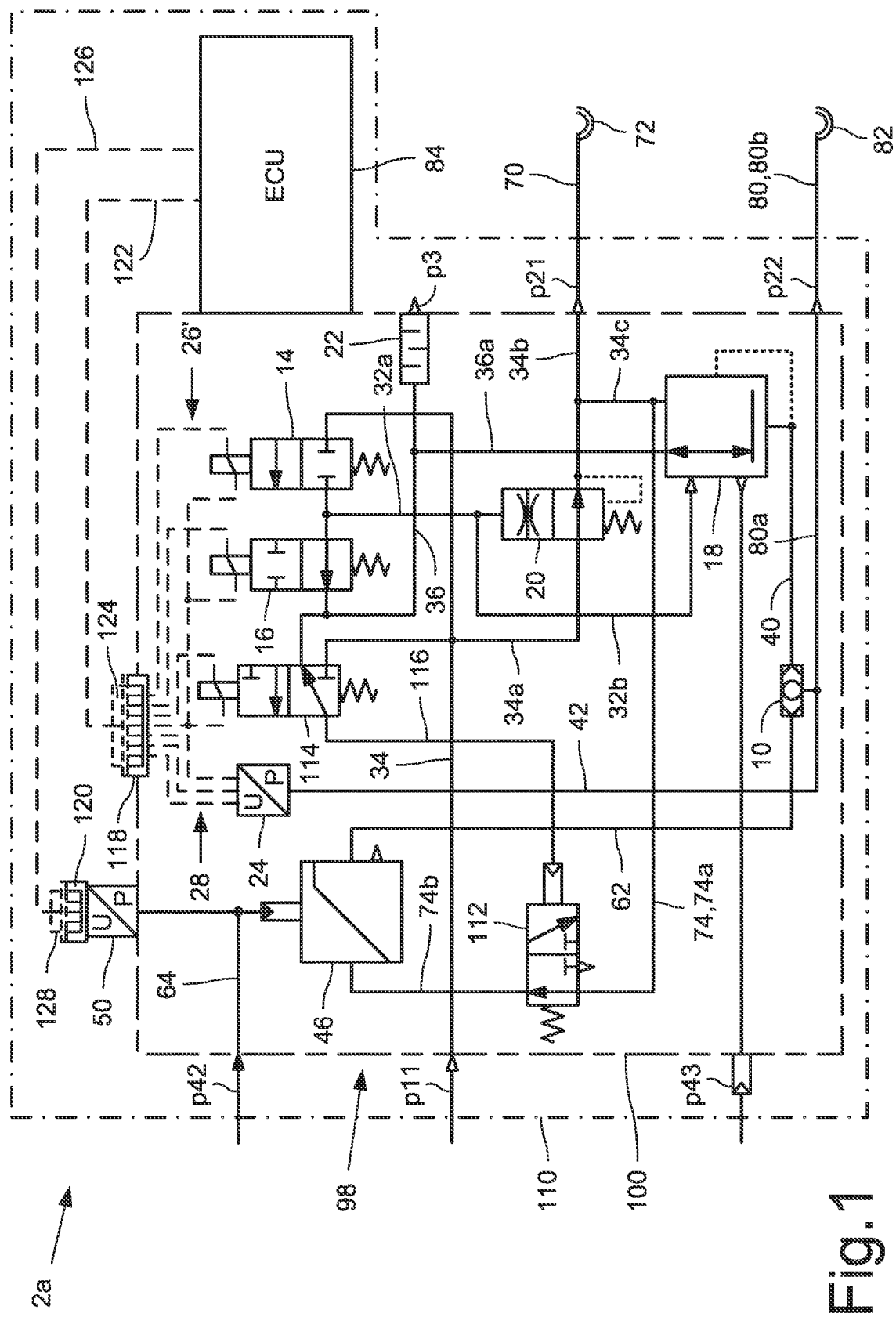
FIG. 1 shows a first specific embodiment of a trailer control module according to the subject matter of the present disclosure in a schematic illustration.

A specific exemplary embodiment of a valve arrangement 2a with a trailer control module 98 according to the subject matter of the present disclosure is shown in FIG. 1. The assembly of the trailer control module 98 as enclosed by a system boundary 110 in this case also encompasses the electronic control unit 84, which is fastened on the outside to the housing 100 of the trailer control module 98. Since the construction and mode of operation of the trailer control module 98 substantially correspond to those of the valve arrangement 2 as per FIG. 3, the following description is restricted to the differences in relation thereto.

The redundancy valve 112 is now arranged in the input-side reservoir pressure line 74 of the hydraulically activated relay valve 46 and is configured as a pressure-controlled 3/2 directional valve. The pilot valve 114 assigned to the redundancy valve 112 is configured as a 3/2 directional solenoid valve. In the electrically deenergized state of the pilot valve 114, a control pressure line 116 leading to the control input of the redundancy valve 112 is connected to the ventilation line 36 leading to the silencer 22. The control input of the redundancy valve 112 is then unpressurized, and here, the two line portions 74a, 74b of the reservoir pressure line 74 that are separated by the redundancy valve 112 are connected to one another. In the electrically energized state of the pilot valve 114, the control pressure line 116 of the redundancy valve 112 is connected to the reservoir pressure line 34, and the control input of the redundancy valve 112 thus conducts pressure. Then, the input-side line portion 74a of the reservoir pressure line 74 is shut off with respect to the relay-valve-side line portion 74b, and the relay-valve-side line portion 74b is ventilated.

Since the pilot valve 114 is electrically energized during the normal operation of the trailer control module 98, the relay-valve-side line portion 74b of the reservoir pressure line 74 is then ventilated. In this way, the control piston of the hydraulically activated relay valve 46 is, during an actuation of the brake pedal, pressed against a stop, such that pressure oscillations in the hydraulic brake line connected to the hydraulic control pressure input p42, which pressure oscillations would be perceptible as a vibration at the brake pedal, can no longer arise. Higher switching dynamics in relation to an embodiment as a solenoid valve are furthermore achieved by the pressure-controlled configuration of the redundancy valve 112.

The pneumatic pressure sensor 24 is now, via the pneumatic sensor line 42, connected downstream of the shuttle valve 10 to the valve-side line portion 80a of the brake control line 80, such that the applied brake control pressure can now be detected by sensor means even during redundancy operation of the trailer control module 98. By contrast, the hydraulic pressure sensor 50 is now arranged at the outside on the housing 100 of the trailer control module 98, is equipped with a dedicated plug socket 120, and is connected to the electronic control unit 84 via a cable 126 equipped with a corresponding plug 128. The hydraulic pressure sensor 50 is now easily exchangeable if required. By contrast, the electrical control lines 26' of the three solenoid valves 14, 16, 114 and the electrical sensor lines 28 of the pneumatic pressure sensor 24 are led into a plug socket 118 arranged in the outer wall of the housing 100, and are connected to the electronic control unit 84 via a cable 122 equipped with a plug 124.

Figure 2:
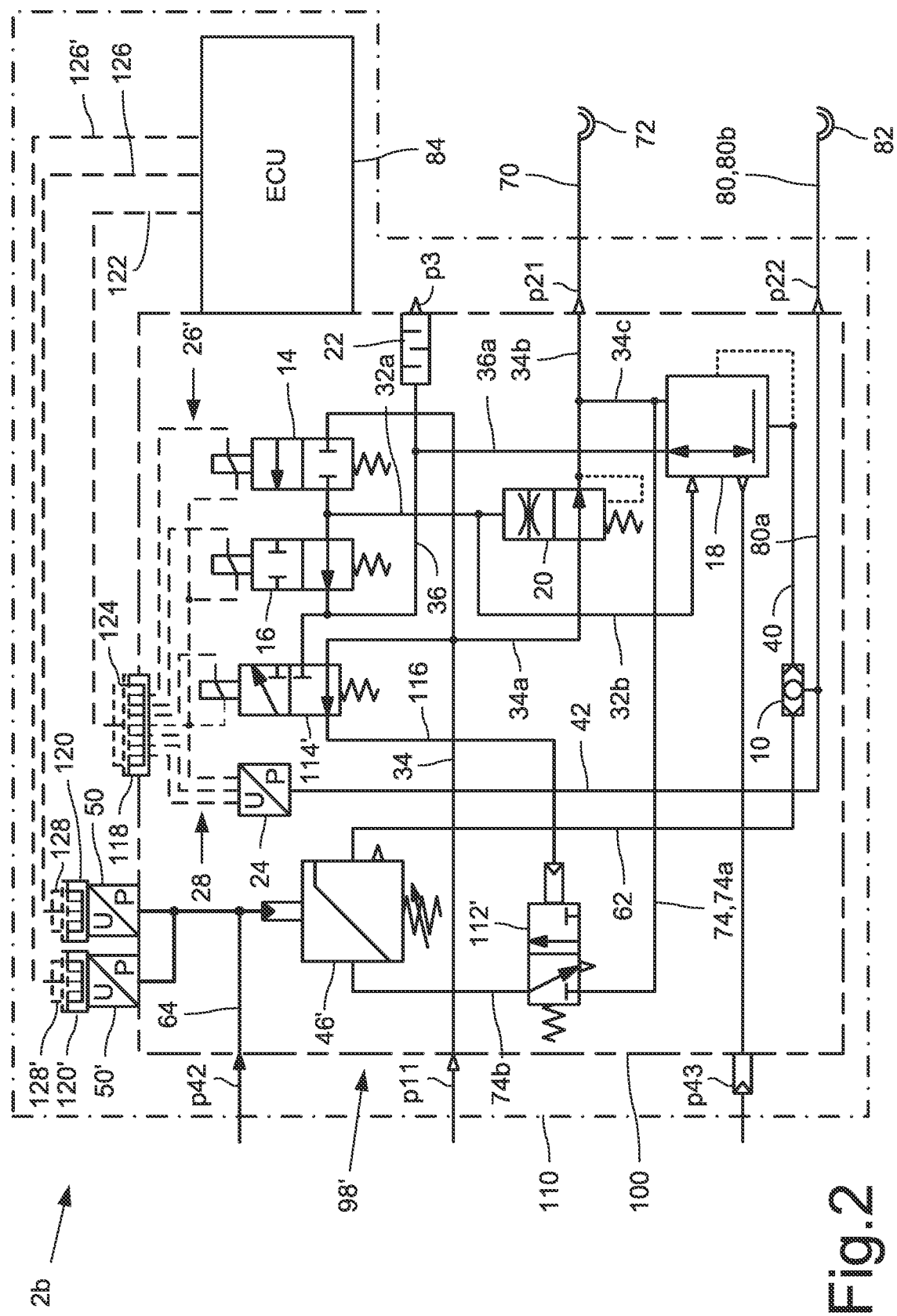
FIG. 2 shows a second specific embodiment of a trailer control module according to the subject matter of the present disclosure in a schematic illustration.

A second specific exemplary embodiment of a valve arrangement 2b shown in FIG. 2, having a trailer control module 98' according to the subject matter of the present disclosure, differs from the first exemplary embodiment illustrated in FIG. 1 in certain details. The redundancy valve 112' configured as a pressure-controlled 3/2 directional valve, and the associated pilot valve 114' configured as a 3/2 directional solenoid valve, now each have a reversed control logic whilst exhibiting the same functionality. In the electrically deenergized state of the pilot valve 114', the control pressure line 116 leading to the control input of the redundancy valve 112' is connected to the reservoir pressure line 34. The control input of the redundancy valve 112' then conducts pressure, and here, the two line portions 74a, 74b of the reservoir pressure line 74 that are separated by the redundancy valve 112' are connected to one another. In the electrically energized state of the pilot valve 114', the control pressure line 116 of the redundancy valve 112' is connected to the ventilation line 36, and the control input of the redundancy valve 112' is thus unpressurized. Then, the input-side line portion 74a of the reservoir pressure line 74 is shut off with respect to the relay-valve-side line portion 74b, and the relay-valve-side line portion 74b is ventilated. Since the pilot valve 114' is electrically energized during the normal operation of the trailer control module 98', the relay-valve-side line portion 74b of the reservoir pressure line 74 is then ventilated.

Figure 6:
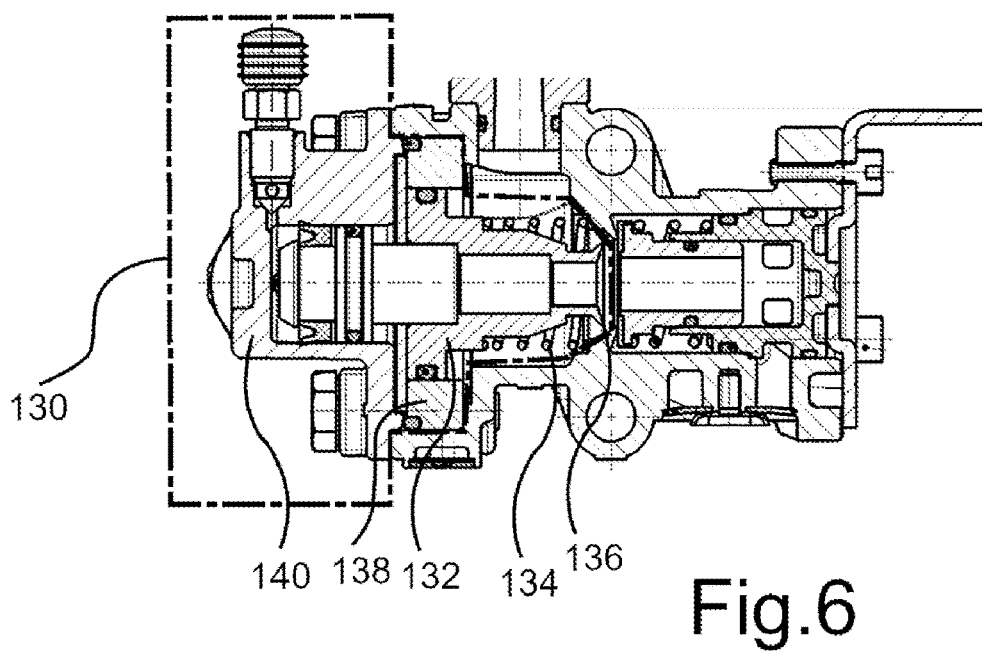
FIG. 6 schematically shows a cross-sectional view of a relay valve with an exchangeable valve control set including a valve piston, a valve seat and a valve spring.
Figures 6A, 6B:
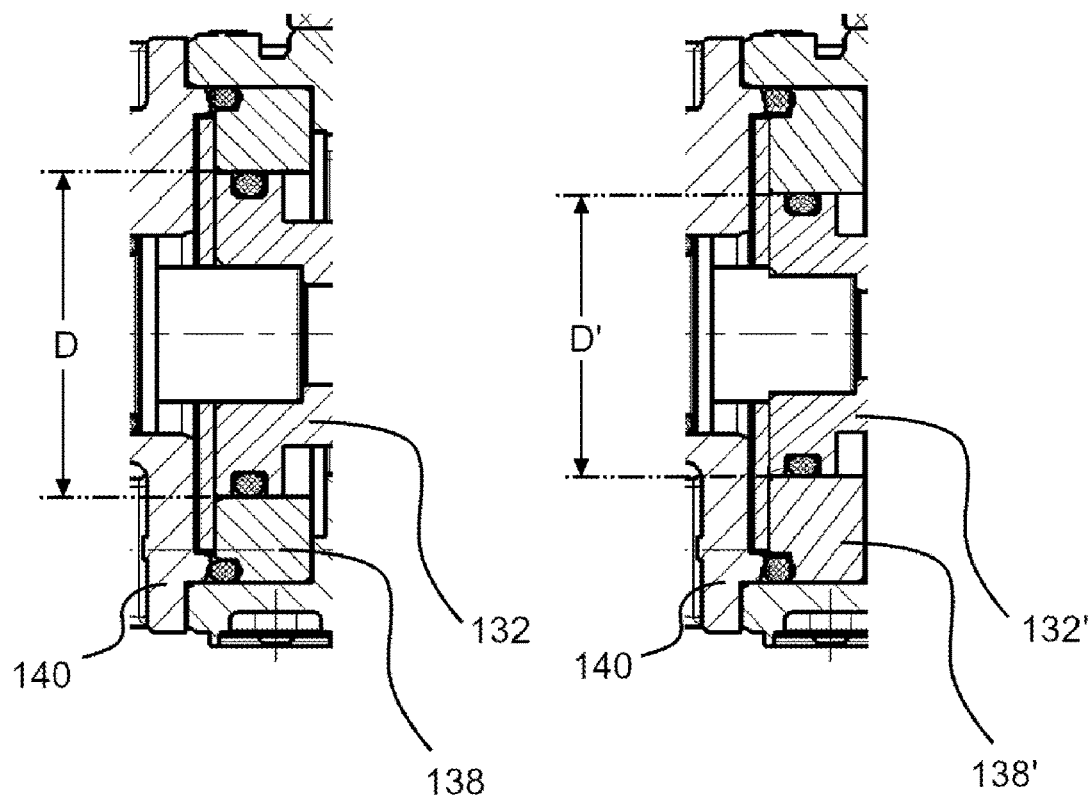
FIG. 6A shows a cross-sectional detail view of the exchangeable valve control set of the relay valve of FIG. 6.
FIG. 6B shows a cross-sectional detail view of a differently dimensioned valve control set interchangeable with the valve control set of FIG. 6A.

In this example, the hydraulically activated relay valve 46' is of adjustable configuration or equipped with an easily exchangeable valve control set 130 as schematically shown in FIG. 6. The exchangeable valve control set 130 comprises at least a valve piston 132, a valve seat 136 and a valve spring 134. The valve control set 130 further has an insert 138 defining the diameter of the valve piston 132, on which the hydraulic control pressure acts. A detail of the exchangeable valve control set 130 of FIG. 6 is shown in FIG. 6A, where the insert 138 defines a piston diameter D. FIG. 6B shows a detail of an alternative interchangeable valve control set that may replace the valve control set 130 of FIG. 6. In the valve control set of FIG. 6B, the insert 138' defines a smaller diameter D' for the piston 132' so that a higher control pressure is required to move the piston 132' against the spring 134. Additionally or alternatively, the spring 134 may also be differently dimensioned to change the spring force that the hydraulic control pressure must overcome to move the piston 132'. The exchangeable valve control set 130 is held in place by a cover 140 that can be removed to exchange the valve control set 130 as a module. In this way, the redundant control path of the trailer control module 98' can be adapted relatively easily to the braking characteristics of the respective vehicle combination.

In addition to the first hydraulic pressure sensor 50, a second hydraulic pressure sensor 50' is now provided, which is connected, in parallel with respect to the first hydraulic pressure sensor 50, to the associated sensor line and which is likewise arranged at the outside on the housing 100 of the trailer control module 98'. The second hydraulic pressure sensor 50' is of structurally identical configuration to the first hydraulic pressure sensor 50, is likewise equipped with a dedicated plug socket 120', and is connected to the electronic control unit 84 via a cable 126' equipped with a corresponding plug 128'. Due to the second hydraulic pressure sensor 50', the functional diagnosis and the redundancy of the pressure sensors 24, 50, 50' are considerably improved.

While the above description constitutes the preferred embodiments of the present invention, it will be appreciated that the invention is susceptible to modification, variation and change without departing from the proper scope and fair meaning of the accompanying claims.

LIST OF REFERENCE CONFIGURATIONS

2 Valve arrangement (prior art)
2a Valve arrangement (first exemplary embodiment according to the subject matter of the present disclosure)
2b Valve arrangement (second exemplary embodiment according to the subject matter of the present disclosure)
4 System boundary
6 Trailer control valve
8 Backup valve
10 Shuttle valve
12 Housing
14 Inlet valve, 2/2 directional solenoid valve 16 Outlet valve, 2/2 directional solenoid valve
18 Relay valve
20 Breakaway valve
22 Silencer
24 Pressure sensor
26, 26' Control lines
28 Sensor lines
30 Plug socket
32a, 32b Control pressure line
34 Reservoir pressure line
34a Further reservoir pressure line
34b Output-side portion of the reservoir pressure line 34a
34c Reservoir pressure line leading to the relay valve 18
36, 36a Ventilation line
38 Control pressure line
40 Brake control line
42 Pneumatic sensor line
44 Housing
46, 46' Relay valve
48 Redundancy valve, 3/2 directional solenoid valve
50, 50' Pressure sensor
52 Control lines
54 Plug socket
56 Sensor lines
58 Plug socket
60 Control pressure line
62 Brake control line
62a Inner line portion of the brake control line 62
62b Outer line portion of the brake control line 62
64 Control pressure line
66 Reservoir pressure line
68 Pipe connector, T piece
70 Reservoir pressure line
72 Coupling head with the designated purpose "reservoir" (red)
74 Reservoir pressure line
74a, 74b Line portion
76 Brake control line
78 External brake control line
80 Brake control line
80a, 80b Line portion
82 Coupling head with the designated purpose "brake" (yellow)
84 Electronic control unit (ECU)
86 Cable
88 Plug
90 Cable
92 Plug
94 Cable
96 Plug
98, 98' Trailer control module
100 Housing
102 Cable
104 System boundary
106 Immobilizing brake valve
108 Control pressure line
110 System boundary
112, 112' Redundancy valve, pressure-controlled 3/2 directional valve
114, 114' Pilot valve, 3/2 directional solenoid valve
116 Control pressure line
118 Plug socket
120, 120' Plug socket
122 Cable
124 Plug
126, 126' Cable
128, 128' Plug
130 valve control set
132 valve piston
134 valve spring
136 valve seat
138 insert
140 cover
p1 Reservoir pressure input
p2 Brake control output
p3 Ventilation output
p11 Reservoir pressure input
p21 Reservoir pressure output
p22 Brake control output
p42 Hydraulic control pressure input
p43 Inverted control pressure input

The invention claimed is:

1. A valve arrangement (2a, 2b) of a hydraulically braked tractor vehicle for controlling the brake pressure of a pneumatically braked trailer vehicle, the valve arrangement comprising:
an electronically controlled trailer control valve (6) with an inlet valve (14), an outlet valve (16), a pneumatically activatable relay valve (18), a breakaway valve (20), and with a first pressure sensor (24) for detecting an applied brake control pressure;
a hydraulically controlled backup valve (8) with a hydraulically activated relay valve (46), a redundancy valve (112, 112'), a second pressure sensor (50) for detecting a hydraulic control pressure, and output-side brake control lines (40; 62)
wherein the output-side brake control lines (40; 62) are connected via a shuttle valve (10) to a brake coupling head (82),
wherein the inlet valve (14), the outlet valve (16), and the pneumatically activatable relay valve (18), the breakaway valve (20), and the first and second pressure sensors (24, 50) of the trailer control valve (6), the hydraulically activated relay valve (46), the redundancy valve (112, 112') of the backup valve (8), and the shuttle valve (10) are combined in one common trailer control module (98) with a single housing (100),
wherein a brake control output (p22) of the single housing (100) and the first pressure sensor (24) are arranged downstream from the shuttle valve (10);
wherein the redundancy valve (112, 112') is arranged in an input-side reservoir pressure line (74, 74a) of the hydraulically activated relay valve (46) between an output-side reservoir pressure line (34c) of the breakaway valve (20) and a reservoir pressure input of the relay valve (46) and is configured such that a relay-valve-side portion (74b) of the reservoir pressure line (74) is ventilated during a normal operation of the trailer control module (98).

2. The valve arrangement (2a, 2b) as claimed in claim 1, wherein the inlet valve (14), the outlet valve (16), and the redundancy valve (112, 112') are solenoid valves, the valve arrangement further comprising an electronic control unit (84) connected via electrical control and sensor lines (26', 28, 122, 126, 126') to the solenoid valves (14, 16) and to the first and second pressure sensors (24, 50, 50') of the trailer control module (98).

3. The valve arrangement (2a, 2b) as claimed in claim 1, wherein the second pressure sensor is a hydraulic pressure sensor (50, 50') and the first pressure sensor is a pneumatic pressure sensor (24), wherein at least one of the first and second pressure sensors is mounted on an outside surface of the housing (100) of the trailer control module (98).

4. The valve arrangement (2a, 2b) as claimed in claim 1, wherein the first pressure sensor is a pneumatic pressure sensor (24) connected to a valve-side line portion (80a) of a brake control line (80), the valve-side line portion being arranged between the shuttle valve (10) and a brake control output (p22) of the trailer control module (98).

5. The valve arrangement (2b) as claimed in claim 1, wherein the hydraulically activated relay valve (46') is adjustable.

6. The valve arrangement (2b) as claimed in claim 1, wherein the hydraulically activated relay valve (46, 46') is equipped with an exchangeable valve control set (130) which has at least a valve piston (132), a valve seat (136) and a valve spring (134).

7. A valve arrangement (2a, 2b) of a hydraulically braked tractor vehicle for controlling the brake pressure of a pneumatically braked trailer vehicle, the valve arrangement comprising:
an electronically controlled trailer control valve (6) with an inlet valve (14), an outlet valve (16), a pneumatically activatable relay valve (18), a breakaway valve (20), and with a first pressure sensor (24) for detecting an applied brake control pressure;
a hydraulically controlled backup valve (8) with a hydraulically activated relay valve (46), a redundancy valve (112, 112'), a second pressure sensor (50) for detecting a hydraulic control pressure, and output-side brake control lines (40; 62)
wherein the output-side brake control lines (40; 62) are connected via a shuttle valve (10) to a brake coupling head (82),
wherein the inlet valve (14), the outlet valve (16), and the pneumatically activatable relay valve (18), the breakaway valve (20), and the first and second pressure sensors (24, 50) of the trailer control valve (6), the hydraulically activated relay valve (46), the redundancy valve (112, 112') of the backup valve (8), and the shuttle valve (10) are combined in one common trailer control module (98) with a single housing (100), and
wherein an immobilizing brake valve (106), which is connected via a pneumatic control pressure line (108) to an inverted control pressure input (p43) of the trailer control module (98), is arranged directly on the housing (100) of the trailer control module (98).

8. The valve arrangement (2a, 2b) as claimed in claim 7, wherein an additional hydraulic or pneumatic pressure sensor is connected in parallel with the second pressure sensor (50) or with first pressure sensor (24), respectively, additional hydraulic or pneumatic pressure sensor being arranged on the outside surface of the housing (100) of the trailer control module (98).

9. A valve arrangement (2a, 2b) of a hydraulically braked tractor vehicle for controlling the brake pressure of a pneumatically braked trailer vehicle, the valve arrangement comprising:
an electronically controlled trailer control valve (6) with an inlet valve (14), an outlet valve (16), a pneumatically activatable relay valve (18), a breakaway valve (20), and with a first pressure sensor (24) for detecting an applied brake control pressure;
a hydraulically controlled backup valve (8) with a hydraulically activated relay valve (46), a redundancy valve (112, 112'), a second pressure sensor (50) for detecting a hydraulic control pressure, and output-side brake control lines (40; 62)
wherein the output-side brake control lines (40; 62) are connected via a shuttle valve (10) to a brake coupling head (82),
wherein the inlet valve (14), the outlet valve (16), and the pneumatically activatable relay valve (18), the breakaway valve (20), and the first and second pressure sensors (24, 50) of the trailer control valve (6), the hydraulically activated relay valve (46), the redundancy valve (112, 112') of the backup valve (8), and the shuttle valve (10) are combined in one common trailer control module (98) with a single housing (100),
wherein a brake control output (p22) of the single housing (100) and the first pressure sensor (24) are arranged downstream from the shuttle valve (10);
wherein the first pressure sensor is a pneumatic pressure sensor (24) connected to a valve-side line portion (80a) of a brake control line (80), the valve-side line portion being arranged between the shuttle valve (10) and a brake control output (p22) of the trailer control module (98)
wherein the redundancy valve (112) is configured as a pneumatically activated 3/2 directional valve via which the relay-valve-side portion (74b) of the reservoir pressure line (74) is aerated when the control pressure input is unpressurized, and is ventilated when the control pressure input is conducting pressure, wherein the redundancy valve (112) is controlled by a pilot valve (114) configured as a 3/2 directional solenoid switching valve, and wherein the control pressure input of the redundancy valve (112) is ventilated in an electrically deenergized state of the pilot valve (114) and is aerated in the electrically energized state of the pilot valve (114).

10. A valve arrangement (2a, 2b) of a hydraulically braked tractor vehicle for controlling the brake pressure of a pneumatically braked trailer vehicle, the valve arrangement comprising:
an electronically controlled trailer control valve (6) with an inlet valve (14), an outlet valve (16), a pneumatically activatable relay valve (18), a breakaway valve (20), and with a first pressure sensor (24) for detecting an applied brake control pressure;
a hydraulically controlled backup valve (8) with a hydraulically activated relay valve (46), a redundancy valve (112, 112'), a second pressure sensor (50) for detecting a hydraulic control pressure, and output-side brake control lines (40; 62)
wherein the output-side brake control lines (40; 62) are connected via a shuttle valve (10) to a brake coupling head (82),
wherein the inlet valve (14), the outlet valve (16), and the pneumatically activatable relay valve (18), the breakaway valve (20), and the first and second pressure sensors (24, 50) of the trailer control valve (6), the hydraulically activated relay valve (46), the redundancy valve (112, 112') of the backup valve (8), and the shuttle valve (10) are combined in one common trailer control module (98) with a single housing (100),
wherein a brake control output (p22) of the single housing (100) and the first pressure sensor (24) are arranged downstream from the shuttle valve (10);
wherein the first pressure sensor is a pneumatic pressure sensor (24) connected to a valve-side line portion (80a) of a brake control line (80), the valve-side line portion being arranged between the shuttle valve (10) and a brake control output (p22) of the trailer control module (98);

wherein the redundancy valve (112') is configured as a pneumatically activated 3/2 directional valve, via which the relay-valve-side portion (74b) of the reservoir pressure line (74) is ventilated when the control pressure input is unpressurized and is aerated when the control pressure input is conducting pressure, wherein the redundancy valve (112') is assigned a pilot valve (114') which is configured as a 3/2 directional solenoid switching valve, and wherein the control pressure input of the redundancy valve (112') is aerated in an electrically deenergized state of the pilot valve (114') and is ventilated in an electrically energized state of the pilot valve (114').

* * * * *